United States Patent [19]

Watanabe

[11] 4,086,510
[45] Apr. 25, 1978

[54] FLAT MINIATURE DYNAMOELECTRIC MACHINE

[75] Inventor: Seizo Watanabe, Hachioji, Japan

[73] Assignee: Olympus Optical Co., Ltd., Toyko, Japan

[21] Appl. No.: 699,616

[22] Filed: Jun. 25, 1976

[30] Foreign Application Priority Data

| Jun. 26, 1975 | Japan | 50-90682 |
| Oct. 30, 1975 | Japan | 50-148087 |
| Nov. 21, 1975 | Japan | 50-158323 |
| Nov. 27, 1975 | Japan | 50-160603 |
| Nov. 28, 1975 | Japan | 50-160673 |
| Nov. 28, 1975 | Japan | 50-160674 |
| Dec. 8, 1975 | Japan | 50-166059 |
| Dec. 16, 1975 | Japan | 50-170347 |
| Nov. 21, 1975 | Japan | 50-139904 |

[51] Int. Cl.² .................................... H02K 13/00
[52] U.S. Cl. ............................ 310/242; 310/248; 310/40 MM; 310/72; 310/89; 310/90
[58] Field of Search ................... 310/268, 90, 174, 89, 310/157, 40 MM, 232, 233, 229, 230, 236, 237, 72, 239, 242, 247, 248, 249

[56] References Cited

U.S. PATENT DOCUMENTS

| 2,483,013 | 9/1949 | Kopprasch | 310/90 |
| 2,743,385 | 4/1956 | Potter | 310/90 |
| 2,904,709 | 9/1959 | Lautner | 310/90 |
| 3,098,958 | 7/1963 | Katz | 318/138 |
| 3,207,563 | 9/1965 | Muijderman | 308/172 |
| 3,234,417 | 2/1966 | Somers | 310/40 MM |
| 3,290,528 | 12/1966 | Adler | 310/154 |
| 3,305,741 | 2/1967 | Linder | 310/40 MM |
| 3,308,319 | 3/1967 | Faulhaber | 310/154 |
| 3,357,756 | 12/1967 | Fehr | 310/90 |
| 3,500,087 | 3/1970 | Wendt | 310/90 |
| 3,555,320 | 1/1971 | Johnson | 310/89 |
| 3,732,616 | 5/1973 | Masrodonato | 310/89 |
| 3,786,290 | 1/1974 | Papst | 310/90 |
| 3,790,835 | 2/1974 | Takeda | 310/268 |
| 3,805,103 | 4/1974 | van de Griend | 310/237 |

*Primary Examiner*—R. Skudy
*Attorney, Agent, or Firm*—Ostrolenk, Faber, Gerb & Soffen

[57] ABSTRACT

A flat miniature dynamoelectric machine comprises a flat rotor with an assembled coreless coil, a commutator having an exposed portion for sliding contact with brushes and integrally carrying the rotor, a shaft on which the commutator is mounted together with the rotor, a housing including bearing means for rotatably supporting and housing the shaft together with the rotor and the commutator mounted thereon, one end of the shaft projecting externally of the housing, a magnet disposed within the housing in opposing relationship with the peripheral surface or end face of the rotor, electrically conductive brushes located within the housing for sliding contact with the exposed portion of the commutator, and a thrust bearing plate mounted on the housing in bearing engagement with the opposite end of the shaft. The thrust bearing plate facilitates close control over the mounting position of the shaft, thereby stabilizing the positional relationship between the various parts.

12 Claims, 35 Drawing Figures

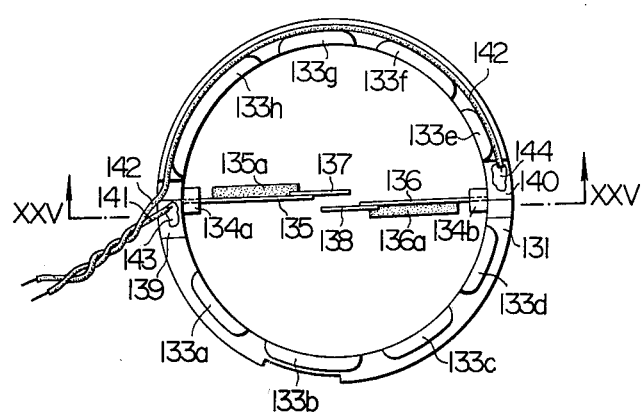
FIG. 24
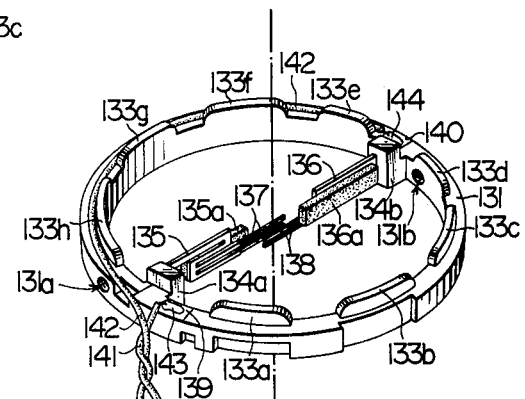
FIG. 26
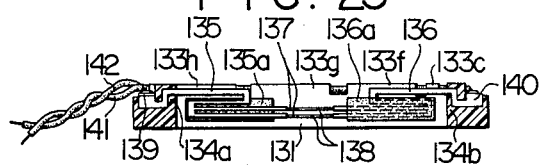
FIG. 25
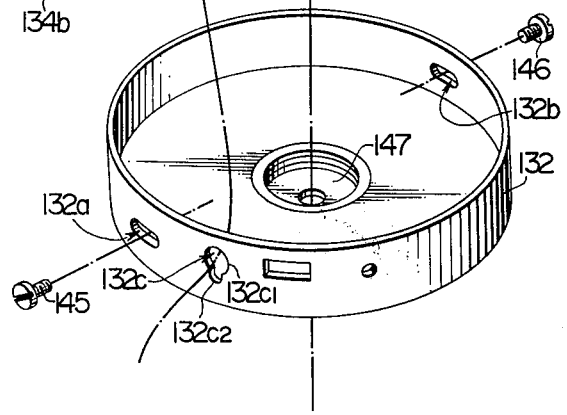

FLAT MINIATURE DYNAMOELECTRIC MACHINE

BACKGROUND OF THE INVENTION

The invention relates to a flat miniature dynamoelectric machine.

Motors or generators incorporating a flat rotor which is supported by a commutator in order to minimize the axial thickness and the overall size of the machine are already known, and are commonly referred to as flat miniature dynamoelectric machines. An electric motor of this type may be used in a small size electrical instrument such as pocket type tape recorder, and in such applications, it is essential that the various parts of the structure be precisely machined to avoid a degradation in the precision which is likely to occur in an instrument of small size. In particular, a high degree of precision is required for the mounting of the motor shaft since any positional error of the shaft may upset the positional relationship between the rotor and the magnet or between the commutator and the brushes, causing a degradation in the performance of the machine.

In conventional dynamoelectric machines of this type, a single washer or a plurality of washers are utilized to provide a thrust bearing. In this instance, friction occurs between one of the washers and an adjacent member or between the washers themselves, and it is necessary to be able to supply a variety of different thicknesses in order to permit a desired positioning with a sufficient degree of accuracy. Alternatively, an anti-abrasion disc, may be disposed at the bottom of an opening which receives one end of the shaft, in order to serve as a thrust bearing. However, the position of abutment between the shaft end and the disc is subject to variation, which required a troublesome centering operation for the shaft. In addition, the opening must be machined to a high accuracy.

SUMMARY OF THE INVENTION

It is an object of the invention to provide a novel flat miniature dynamoelectric machine which is improved over conventional flat miniature dynamoelectric machines with respect to the simplicity of arrangement and the accuracy achieved, in particular, by providing a thrust bearing plate which resiliently bears against the inner end of the shaft so as to stabilize the positioning of the shaft.

In accordance with the invention, the provision of a thrust bearing plate which resiliently bears against the inner end of the shaft is effective to completely suppress any movement of the shaft in the lengthwise direction, thereby maintaining a proper positional relationship between the rotor and the magnet or between the commutator and the brushes, without imposing any restriction on the length of the output end of the shaft. Thus, any associated member such as an output pulley may be mounted thereon. As will be further described later, the remaining parts of the structure are improved according to the invention to provide a dynamoelectric machine of a reduced size and higher precision.

BRIEF DESCRIPTION OF THE DRAWINGS

FIG. 24 is a plan view of a conductive brush and its associated support assembly;

FIG. 25 is a cross section taken along the line XXV—XXV shown in FIG. 24;

FIG. 26 is a perspective view, illustrating the relationship of the conductive brush and its suppport assembly shown in FIG. 24 relative to a housing;

DETAILED DESCRIPTION OF EMBODIMENTS

Figure 1:
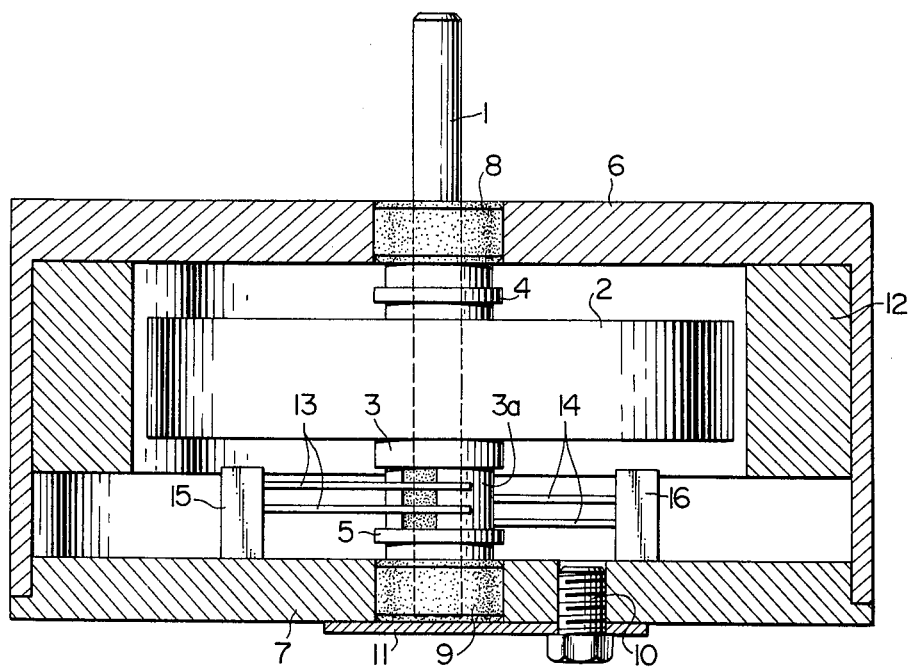
FIG. 1 is a cross section of an electric motor according to one embodiment of the invention.

Referring to FIG. 1, there is shown an electric motor constructed in accordance with one embodiment of the invention. Specifically, the motor comprises a shaft 1, and a rotor 2 which is integral with a commutator 3 and is fixedly mounted on the shaft 1 intermediate its ends.

The rotor 2 has a coreless coil (see FIG. 6) assembled therein. A pair of washers 4, 5 are disposed on the shaft 1 on the opposite sides of the rotor 2 and the commutator 3, and serve as slingers. Fixedly mounted centrally in upper and lower housing portions 6, 7 are a pair of oil impregnated bearings 8, 9 which rotatably support the shaft 1. The lower end of the shaft is prevented from the thrustwise movement by a resilient plate 11 which is secured to the lower housing portion 7 by means of a bolt 10. The upper and lower housing portions 6, 7 function as a yoke, the upper housing 6 being cylindrical in configuration while the lower housing being in the form of a disc. The two housing portions are connected together around the periphery of the lower housing 7. A magnet 12 is mounted within the upper housing portion 6 and is located in opposing relationship with the peripheral surface of the rotor 2, while pairs of brushes 13, 14 are mounted on a pair of supports 15, 16 which are fixedly mounted on the lower housing portion 7. The pairs of brushes 13, 14 are disposed on diametrically opposite sides of the commutator 3 and engage an exposed peripheral portion 3a thereof.

In the motor thus constructed, the oil impregnated bearings comprise so-called oilless metal or like material. They are initially fixedly mounted on the upper and lower housing portions 6, 7 without finishing, and both are then simultaneously subjected to a sizing, whereby the centering and surface finishing of both bearings 8, 9 are performed simultaneously.

Figure 2:
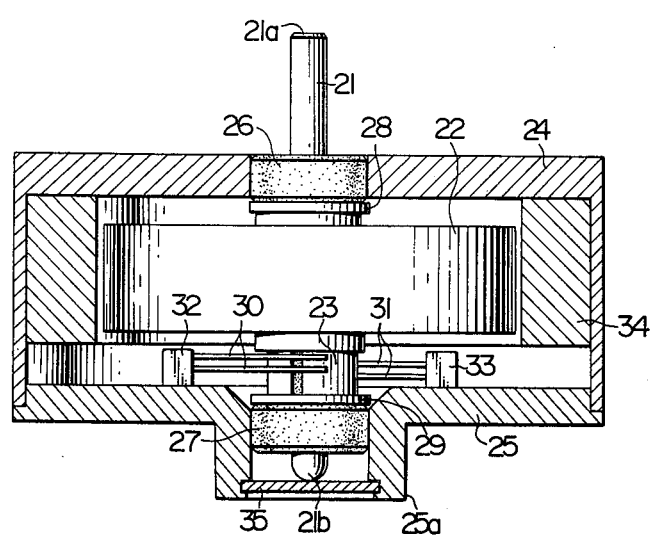
FIG. 2 is a cross section of a motor according to another embodiment of the invention.

FIG. 2 shows another embodiment of the invention. Referring to FIG. 2, the motor comprises a shaft 21, and a rotor 22 integral with a commutator 23 is fixedly mounted on the intermediate portion of the shaft 21. The opposite end portions of the shaft 21 are rotatably supported by a pair of bearings 26, 27 which are centrally fitted in a pair of upper and lower housing portions 24, 25. A pair of slinger washers 28, 29 are fitted on the shaft 21 immediately adjacent to the bearings 26, 27. Pairs of conductive brushes 30, 31 are attached to a pair of supports 32, 33 which are in turn fixedly mounted on the lower housing portion 25, the brushes 30, 31 being located on diametrically opposite opposing sides of the commutator 23 and engaging an exposed peripheral portion thereof. A permanent magnet 34 is mounted within the upper housing portion 24 so as to be disposed in opposing relationship with the outer periphery of the rotor 22. The shaft 21 has an output end 21a which projects outwardly from the upper housing portion to facilitate the transmission of power to the exterior.

The lower housing portion 25 includes a centrally located downward extension 25a to which an anti-abrasion plate 35 is secured as by crimping. The anti-abrasion plate 35 may comprise stainless steel to which a hardening treatment is applied so as to present a surface of a greater hardness than that of the shaft 21. Alternatively, it may comprise a synthetic resin of a high hardness. The plate 35 serves to support the end 21b of the shaft 21 which is opposite from the output end. The plate 35 extends substantially perpendicular to the shaft 21 and prevents a thrustwise movement thereof by bearing against the end 21b.

Figure 3:
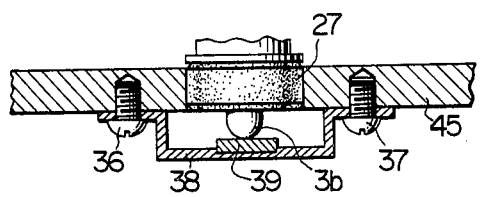
FIGS. 3 and 4 are fragmentary sections, illustrating modifications of the motor shown in FIG. 2.

In FIG. 3, an arrangement is shown in which a dishshaped bearing plate 38 is secured, as by set screws 36, 37, to the bottom surface of the central portion of a lower housing portion 45, and an anti-abrasion plate 39 is centrally mounted on the bearing plate 38 to suppress a thrustwise movement of the end 21b of the shaft 21.

Figure 4:
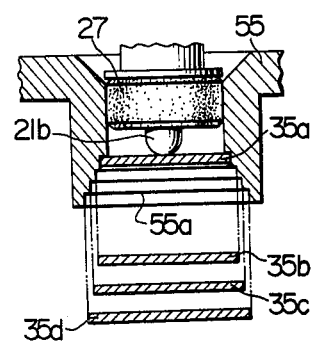

FIG. 4 shows a stepped mount 55a which is formed in a portion of a lower housing portion 55 designed to support the bearing. There are provided a plurality of anti-abrasion plates 35a, 35b . . . 35d of different diameters which are adapted to fit various steps in the mount. A particular one of the plates 35 may be chosen depending on the position of the abutting end 21b of the shaft 21 so as to provide an optimum thrust bearing. In this embodiment, the remaining portions of the lower housing portions 45, 55 are constructed in a manner similar to the lower housing portion 25 and are therefore not described in detail.

Figure 5:
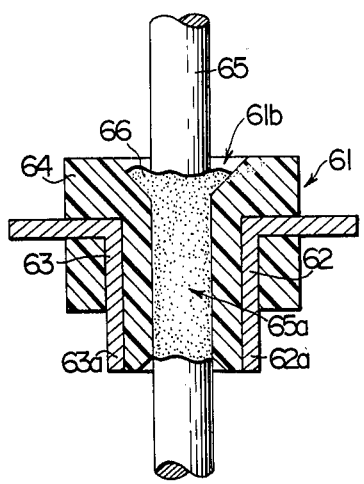
FIG. 5 is a cross section of the coupling between the motor shaft and the commutator.
Figure 6:
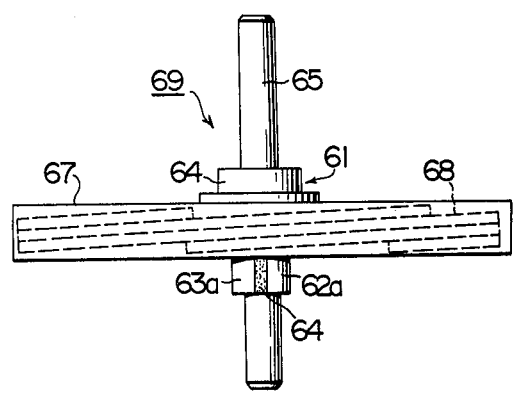
FIG. 6 is a side elevation of the motor shaft and rotor.

FIG. 5 shows the structure of a rotary portion of the flat miniature dynamoelectric machine according to the invention. In FIG. 5, a commutator 61 comprises a plurality of conductive pieces 62, 63 which are integrally molded with an insulating body 64 which may comprise rubber or synthetic resin, for example. The conductive pieces 62, 63 have exposed lower portions 62a, 63a which are adapted for sliding contact with conductive brushes (not shown). When mounting the commutator 61 on a shaft 65 of the motor, an adhesive 66 of synthetic resin is applied to a portion of the shaft 65 on which the commutator is mounted, and then the commutator 61 fitted thereon. Any excess amount of adhesive 66 will be stored in a recess 61b which is formed in the upper surface of the commutator 61. After integrally connecting the commutator 61 with the shaft 65, a rotor 67 is fitted as shown in FIG. 6, and an electrical connection is made between the conductive pieces 62, 63 and a coreless coil 68 (shown in phantom lines) located within the rotor 67. Finally, the assembly is integrally molded by casting in a mold, thus producing a rotating assembly 69.

Figure 7:
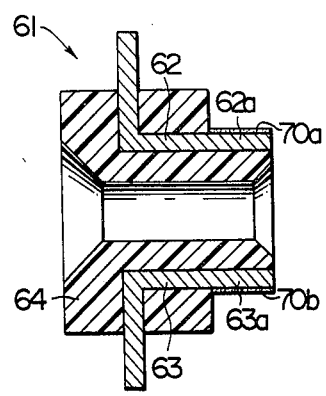
FIGS. 7 and 8 are cross sections of the commutator of the motor.

In FIG. 7, when the commutator 61 is completed and before it is fixed on the shaft 65, the exposed portions 62a, 63a of the conductive pieces 62, 63 are plated with layers 70a, 70b of gold alloy having a greater hardness than the copper alloy which forms the conductive pieces 62, 63. These plated layers are formed by plating the entire commutator 61 while covering it with a vinyl tube or the like except for the exposed portions 62a, 63a.

Figure 8:
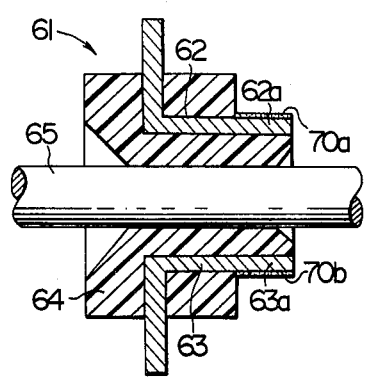

In FIG. 8, after the commutator 61 is fixedly mounted on the shaft 65, the commutator 61 is covered with a vinyl tube or the like except for the exposed portions 62a, 63a, and then subjected to a plating process, thus providing layers 62a, 63a of gold metal on the exposed portions while the commutator is mounted on the shaft.

The provision of gold alloy plated layers of a greater hardness than the copper alloy on the sliding portions of the conductive pieces which are formed of the copper alloy reduces the cost and increases the abrasion resistance. By way of example, a three micron thick plated layer achieves a useful life which is as long as 1000 hours. When a suitable material such as Ag-Pd ally or the like is chosen for the brushes depending on the plated layers, there is achieved a good electrical relationship, minimizing the occurrence of noises.

Figure 9:
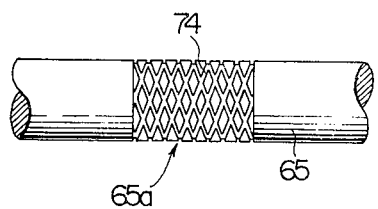
FIGS. 9 and 10 are plan views of part of the motor shaft.
Figure 10:
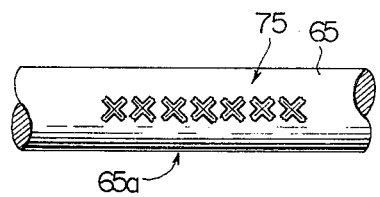
Figure 11:
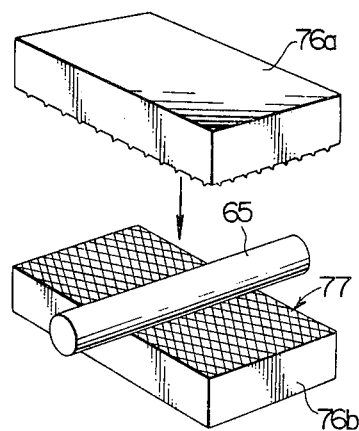
FIG. 11 is a perspective view, illustrating a working applied to the shaft shown in FIG. 10.
Figure 12:
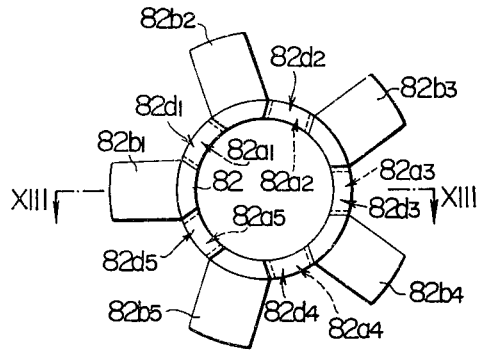
FIG. 12 is a plan view of a tubular conductive body which is used to form a commutator.
Figure 13:
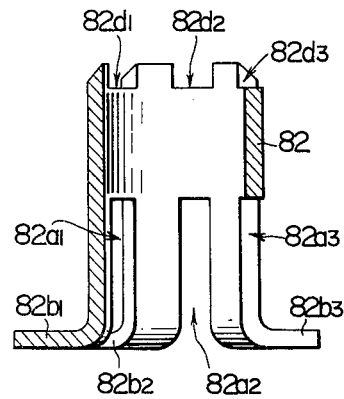
FIG. 13 is a cross section taken along the line XIII—XIII shown in FIG. 12.
Figure 14:
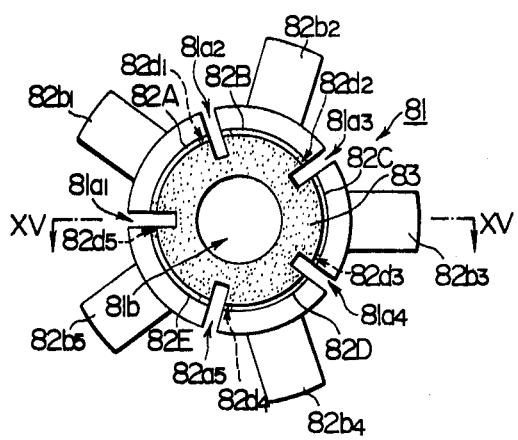
FIG. 14 is a plan view of the completed commutator.

FIG. 9 shows peripheral grooves 74 formed in the portion 65a of a shaft 65 which is adapted to receive a commutator thereon, for stregthening the bonding with the commutator 61. The grooves 74 are helical in the arrangement of FIG. 9, but may be of a criss-cross form and arranged in a row, as shown at 75 in FIG. 10. Such grooves 75 may be readily formed by providing a pair of upper and lower press blocks 76a, 76b having complementarily shaped surfaces in which a plurality of intersecting edges 77 are formed, and pressing the shaft between the both blocks 76a, 76b. However, it should be understood that the grooves may have other configurations.

FIGS. 12 to 15 show one example of a commutator. Specifically, referring to FIGS. 12 and 13, the commutator shown comprises a tubular conductive body 82 having a plurality of notches 82a1, 82a2, 82a3 . . . 82a5 of an arbitrary width formed in its lower portion, the material of the body 82 between adjacent notches being folded outwardly to form tabs 82b1, 82b2, 82b3 . . . 82a5 which serve as the means for providing a connection with a coil or coils. A plurality of notches 82d1, 82d2, 82d3 . . . 82d5 each of a width which is equal to or greater than that of the notches in the lower portion are formed in the top of the body 82 in staggered fashion with respect to the adjacent notches 82d1 to 85d5, the upper end face of the tube wall is bevelled so that the outer surface terminates at a lower elevation than the inner surface. Subsequently, the entire body 82 is molded, except the exposed portions adapted for sliding contact with the brushes, in a synthetic resin material, thus providing a modelling 83 (see FIGS. 14 and 15).

Figure 15:
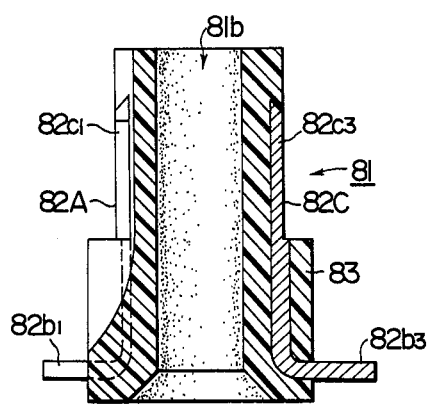
FIG. 15 is a cross section taken along the line XV—XV shown in FIG. 14.

Thereafter, a plurality of cuts 81a1, 81a2, 81a3 . . . 81a5 (see FIG. 14) are formed so as to extend through corresponding upper and lower notches, thus dividing the body 82 into five body sections, that is, commutator segments 82A, 82B, 82C, 82D, 82E and simultaneously forming exposed portions 82c1, 82c2, 82c3 . . . 82c5 adapted for sliding contact (only exposed portions 82c1, 82c5 being shown in FIG. 15). Finally, an axial bore 81b is formed in the modelling 83, and the various parts are finished to provide a commutator 81.

Figure 16:
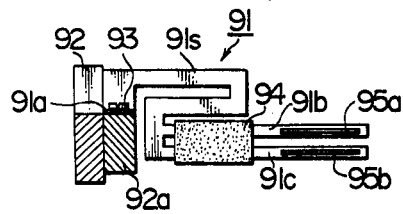
FIG. 16 is a side elevation of the conductive brush of the motor.

The flat miniature dynamoelectric machine according to the invention may utilize a Z-shaped conductive brush assembly. Referring to FIG. 16, a conductive brush assembly 91 includes a support member 91s, which is formed by shaping a thin resilient metal piece into Z-configuration as by photoetching. The support member has an increased length from its mounting end 91a to its free end and is worked so that it is deburred and free from deformation in the slit region between adjacent limbs of the Z-configuration during the pressing operation. The support member 91s is mounted at the left-hand end, as viewed in FIG. 16, of its top limb, and has a free end portion at the right-hand end of the bottom limb which is adapted to be disposed in opposing relationship with the commutator. The free end is fork shaped and comprises a pair of parallel running fingers 91b, 91c, and contacting elements 95a, 95b of a material such as platinum wire is secured thereto as by soldering. A buffering member 94 which comprises a thin sheet of polyurethane foam or rubber is applied across the fingers 91b, 91c at a position toward the mounting base 91a in order to prevent the fingers from resonating. The buffering member 94 may extend over the entire area of the Z-shaped portion. The mounting base 91a of the conductive brush 91 is bent at right angles to the horizontal, and is secured to a projection 92a integral with a motor housing 92 as by a screw 93 (see also FIG. 17).

Figure 17:
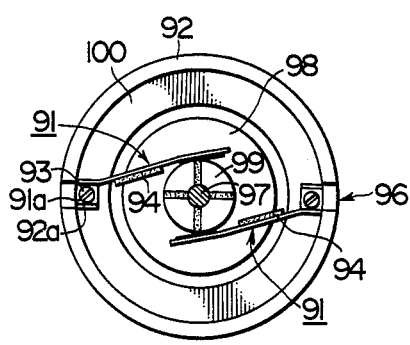
FIG. 17 is a plan view of a motor constructed according to a further embodiment of the invention.

As shown in FIG. 17, a pair of conductive brushes 91 are disposed for abutting engagement with a commutator 99 which is mounted on a shaft 97 of a motor 96, in integral manner with a rotor 98. An annular shaped magnet 100 is secured around the interior of housing 92 so as to surround the rotor 98 mounted on the shaft 97.

The formation of the support member 91s from a resilient metal piece produces a resilience of a constant magnitude of the conductive brush 91 in a definite direction, and the Z-shape provides an increased effective length despite its reduced space requirement. The fork-shaped fingers 91b, 91c further contribute to the stable resilience effect. Since contacting members 95a, 95b of platinum or like material are attached to the free end of the fingers, abrasion thereof as a result of mechanical contact is prevented. The application of the buffering member 94 to the base of the fingers 91b, 91c, prevents the brushes from experiencing a resonance effect. In addition the formation of the resilient metal piece by a photoetching process avoids the difficulties experienced heretofore with the elimination of deformation and deburring, enabling it to be manufactured in a simple manner while retaining the advantage of a simple mounting as in the prior arrangement.

Figure 18:
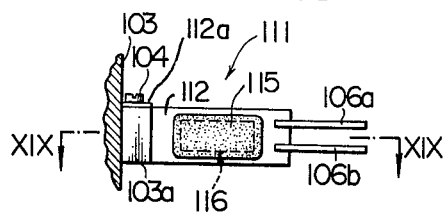
FIG. 18 is a side elevation of another example of the conductive brush.
Figure 20:
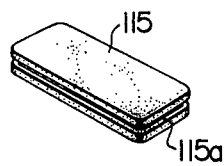
FIG. 20 is a perspective view of an exemplary buffering member.
Figure 19:
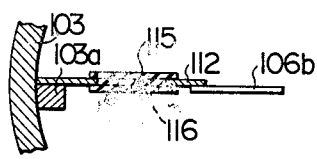
FIG. 19 is a cross section taken along the line XIX—XIX shown in FIG. 18.

FIGS. 18 to 23 show a conductive brush of a flat miniature dynamoelectric machine in which a buffering member is mounted without the use of an adhesive. Referring to FIGS. 18 to 20, a conductive brush assembly 111 essentially comprises a support member 112 of a resilient metal piece having its one end bent upwardly at right angles to the plane of the member, the bent portion 112a being secured as by a set screw 104 to the upper surface of a mounting member 103a which is fixedly mounted inside a housing 103. A buffering member 115 which may comprise a thin sheet of polyurethane foam or rubber and is used for preventing a resonance effect is fixedly mounted on the middle portion of the support member, while a pair of contacting members 106a, 106b which may comprise platinum are secured to the free end of the support member as by soldering. The support member 112 is centrally formed with an elongate slot 116 (shown in dotted fashion) which is slightly smaller than the outer perimeter of buffering member 115, and the latter is formed with a continuous groove 115a around its entire periphery. By fitting the groove 115a with the edge of the slot 116, the buffering member 115 is engaged with the support member 112. Since the buffering member 115 is formed of a rubber or polyurethane foam, it has sufficient flexibility to permit its mounting in this manner. In addition, because the engagement takes place along the entire periphery, it is firmly bonded together with the support member.

Figure 21:
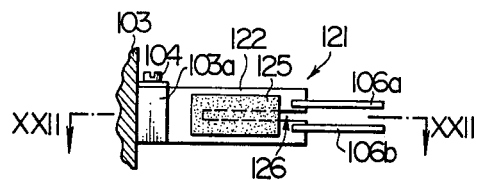
FIG. 21 is a side elevation of a further example of the conductive brush.
Figure 23:
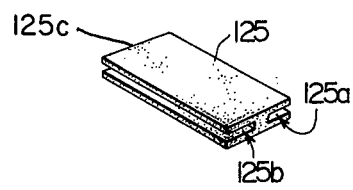
FIG. 23 is a perspective view of another example of buffering member.
Figure 22:
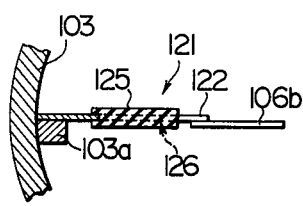
FIG. 22 is a cross section taken along the line XXII—XXII shown in FIG. 21.

FIGS. 21 to 23 show a modification wherein a support member 122 is formed with a notch 126, and a buffering member 125 is configured to be fitted into the notch 126. More specifically, the support member 122 is formed with a notch 126 of a reduced width which extends from its forward end toward the opposite end along the axis thereof. On the other hand, the buffering member 125 is formed with a pair of grooves 125a, 125b of a width which is approximately equal to the thickness of the support member 122. These grooves extend along the lengthwise sides of the buffering member 125 as well as along the side 125c extending therebetween which is located nearer the mounting base of the support member. When fitting the buffering member 125 into the support member 122, the base end 125c of the buffering member 125 is initially inserted into the groove 125a, and then the latter is fitted into the notch 126. It is unnecessary to forcibly enlarge the grooves for the purpose of insertion, and since the grooves extend nearly the full periphery of the buffering member 125, a firm bonding is achieved.

Referring to FIGS. 24 to 26 there is shown another form of a flat miniature dynamoelectric machine according to the invention in which a brush support is in the form of a frame which is a close fit with the inner wall of the housing and which is molded in synthetic resin integrally with conductive brushes. As shown in FIGS. 24 and 26, a brush support 131 is in the form of an annular frame having an outer diameter which exactly corresponds to the diameter of the inner periphery wall of a housing 132 (see FIG. 26). A plurality of interrupted upright walls 133a, 133b, ... 133h are formed on the top surface of the brush support 131, and a pair of diametrically opposed mounting members 134a, 134b extend radially inward from the inner wall thereof (see FIGS. 24 to 26). The mounting members 134a, 134b each support one end of one of a pair of electrically conductive support members 135, 136 which may comprise a resilient metal blade, for example. The free end of each of the support members 135, 136 has one end of a contacting member 137 or 138 fixedly mounted thereon which may be in the form of an electrically conductive wire. A buffering member 135a, 136a which may comprise polyurethane foam is secured to that side of the support member 135, 136 and the contacting member 137, 138 which is remote from the portions adapted for sliding contacting with the commutator.

Said one end of the support members 135, 136 extend through the respective mounting member 134a, 134b to be exposed on the top surface of the brush support 131 where it is folded to assume a horizontal position to form a connection pad 139, 140. A pair of lead wires 141, 142 have their ends soldered at 143, 144 to these pads 139, 140. One of the lead wires 142 extends around the exterior side of the upright walls 133e, 133f, 133g and 133h to be joined with the other lead wire 141 as by twisting them together.

As shown in FIG. 26, the brush support 131 thus formed is fitted into a lower housing portion 132, which is formed with a pair of horizontally elongate slots 131a, 132b which are located diametrically opposite one another and which may be engaged by set screws 145, 146 extending therethrough and threadably engageable with a pair of threaded bores 131a, 131b formed in the brush support 131 at corresponding positions, thus securing the support 131 within the housing portion 132. Adjacent to one of the slots, 132a, the housing portion 132 is formed with a keyhole-shaped opening 132c, through which the twisted lead wires 141, 142 may extend to the exterior. The lead wires 141, 142 are initially passed through a larger portion 132c1 of the opening 132c, and after their end is passed to the exterior thereof, they are held in a smaller portion 132c2 of the opening.

When the brush support 131 is mounted in the lower housing portion 132, a shaft (not shown) which is provided with a rotor and a commutator may be mounted therein by passing its lower end through a bearing 147. An upper housing portion (not shown) is fitted with the housing portion 132, and houses a bearing which supports upper end of the shaft. Then, the contacting members 137, 138 are disposed on diametrically opposed sides of the exposed portion of the commutator. The electrical degrees or angle of the conducting members 137, 178 may be adjusted by loosening the set screws 145, 146 and angularly displacing the brush support 131 along the slots 132a, 132b. It is to be understood that the upper housing portion houses a magnet which cooperates with the rotor.

In the brush assembly described above, the brush support 131 is molded from a synthetic resin integrally with the support members 135, 136 and mounting members 134a, 134b. It is to be noted that the support 131 is not limited to an annular form, but may comprise a frame of any other configuration.

With the embodiment described above, the use of a frame for the brush support 131 facilitates the assembling operation. Since the lead wire 142 extends around the brush support 131 to be joined with the other lead wire 141 and thence to the outside through the opening 132c, no additional space is required for the lead wires. It will be noted that the lead wire 142 will be held between a plurality of upright walls 133e to 133h on the brush support 131 and the interior surface of the housing portion 132, thus completely avoiding any interference with other members located within the housing portion, in particular, with a rotating member such as the rotor or commutator. It will be appreciated that the upright walls 133a to 133h may be replaced by a thoroughly continuous wall. Alternatively, a groove for receiving the lead wire may be formed in the top surface of the brush support 131.

Figure 28:
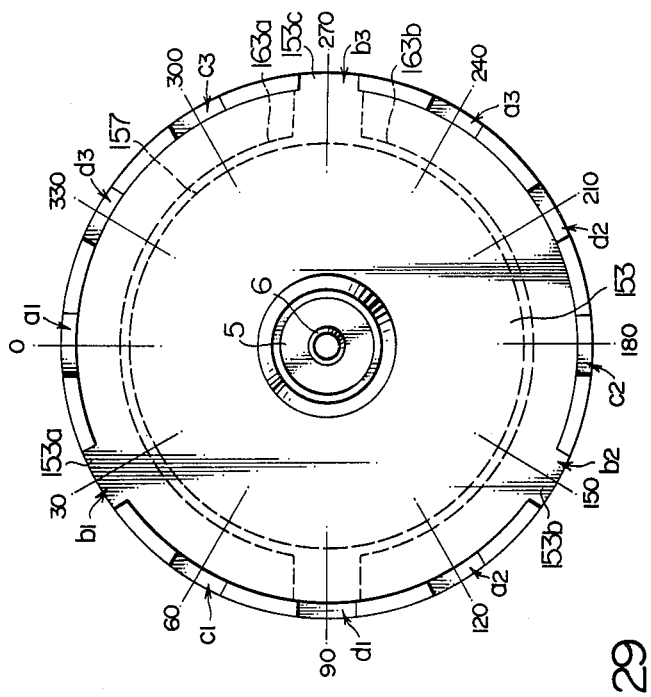
FIG. 28 is a bottom view of the motor shown in FIG. 27.
Figure 27:
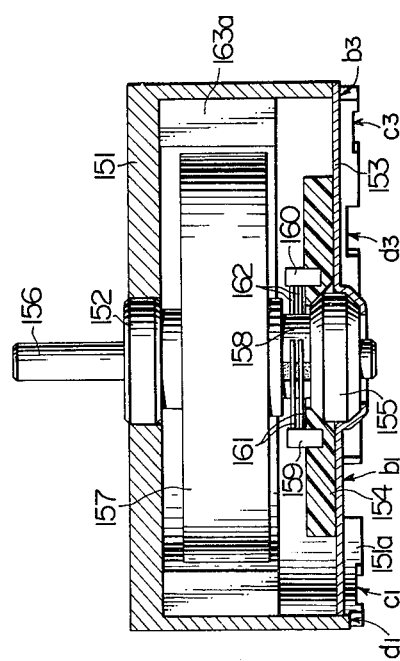
FIG. 27 is a cross section of an electric motor constructed in accordance with an additional embodiment of the invention.
Figure 29:
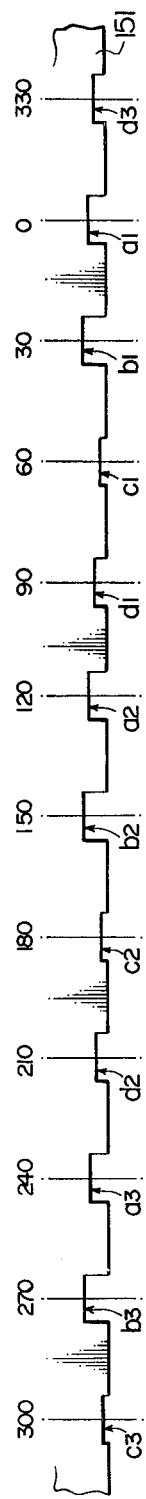
FIG. 29 is a developed view of the housing, illustrating the distribution of notches.

FIGS. 27 to 29 show a miniature dynamoelectric machine according to the invention in which the upper housing portion is formed with a plurality of sets of notches of different depths for mating engagement with pawls formed on the lower housing portion so that the housing portions may be engaged. A particular set of notches are chosen for engagement with the pawls which have an optimum depth corresponding to the length of the shaft, thereby providing an optimum thrust bearing. Referring to FIG. 27, an upper housing portion 151 is cylindrical in configuration and has an open bottom, and serves as a yoke. A bearing 152 is fixedly mounted centrally in the top of the housing portion 151. A lower housing portion 153 is adapted to be joined with the lower edge of the upper housing portion 151, and has a brush mounting member 154 fixedly mounted thereon. A bearing 155 is fixedly mounted in the central portion of the lower housing portion 153 by being held between the housing portion 153 and the brush mounting member 154.

The pair of bearings 152, 155 rotatably carry a shaft 156, on which a rotor 157 and a commutator 158 are fixedly mounted. A pair of posts 159, 160 are fixedly mounted on the brush mounting member 154 and carry a pair of conductive brushes 161, 162 for sliding contact with the peripheral surface of the commutator 158. A pair of semi-circular permanent magnets 163a, 163b (see FIG. 28) are secured to the lower sidewall portion of the upper housing portion 151 so as to collectively surround the rotor 157.

The upper housing portion 151 includes a juncture region 151a along its lower edge in which are formed four sets, each set being comprised of three notches a1, a2, a3; b1, b2, b3; c1, c2, c3; and d1, d2, d3, all of which extend in a direction parallel to the shaft 156. The notches of a set are spaced apart from each other by an angle of 120°. The notches of a particular set extend to an equal depth, while the depth of the notches varies from set to set. In the present example, the notches are spaced at equal angular intervals of 30°, and each notch has an approximately equal width.

FIG. 29 shows a developed view of the juncture region 151a of the frame or upper housing portion 151. As will be evident from this illustration, the set of notches c1, c2, c3 has the shallowest depth; the sets of notches d1, d2, d3 and a1, a2, a3 have an increasingly greater depth; and the set of the notches b1, b2, b3 has the greatest depth. In order to facilitate envisaging the relationship between FIGS. 28 and 29, numerals indicating an angle position at an interval of 30° are entered in these Figures.

The lower housing portion 153 is provided with a set of radially extending pawls or projections 153a, 153b, 153c which are spaced apart from each other by an equal angle of 120° and which can be engaged with a selected set of notches formed in the upper housing portion. In the present example (FIG. 28), the pawls 153a to 153c are shown as engaged with the notches b1, b2, b3 having the maximum depth, and the housing portions are secured together as by soldering or crimping. In the event that an axial relative position between the upper end lower housing portions 151, 153 is found inadequate to provide a satisfactory thrust bearing for the shaft 156 during assembly, the lower housing portion 153 may be rotated to engage the pawls thereon with a different set of notches having a suitable depth.

In this manner, a high accuracy thrust adjustment can be easily and efficiently achieved without the use of a number of special parts such as washers or a special tool for the purpose of thrust adjustment while at the same time avoiding the need for frequent mounting and dismounting of the parts. The notches may be formed in the upper housing portion 151 by simply punching a blank sheet into a configuration as shown in FIG. 29, thus reducing the number of process steps and facilitating a mass production of a high accuracy component. It will be understood that the number of pawls formed on the lower housing portion and their angular interval may be arbitrarily chosen as is the number of notches per set formed in the upper housing as well as their position. The number of sets of notches may be chosen according to the degree of adjustment required.

Figure 30:
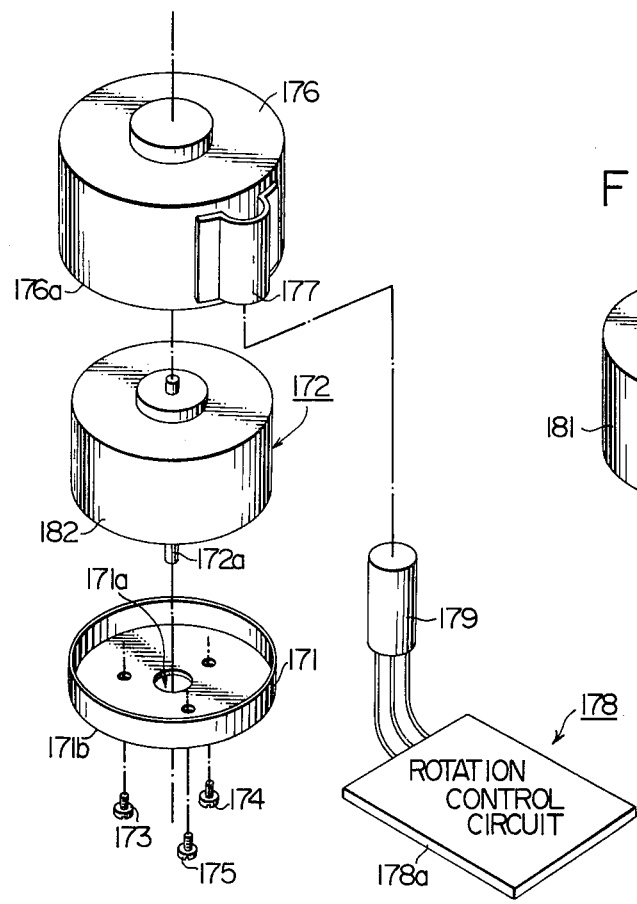
FIG. 30 is an exploded, perspective view of an electric motor according to another embodiment of the invention.

Another arrangement of the flat miniature dynamoelectric machine according to the invention will now be described in which a housing or a shield case therefor is integrally provided with a heat radiating fin in which a transistor is mounted to be cooled by the heat dissipating effect achieved by the rotation of a pulley or the like. Referring to FIG. 30, there is shown a closure 171 for a shield case which is centrally formed with an opening 171a for allowing the passage of an output shaft 172a of a flat miniature motor 172 therethrough. A plurality of set screws 173, 174 and 175 are utilized to secure the motor 172 onto the closure 171. The shield case includes a body 176 which is adapted to enclose the motor 172 secured to the closure 171, and the peripheral edge 176a around the opening of the body 176 is secured to a peripheral flange 171b of the closure 171 as by crimping or soldering.

A heat radiating fin 177 is secured to the outer periphery of the body 176 as by spot welding, soldering or crimping, and a control transistor 179 is inserted inside the fin 177, the transistor 179 being used in a rotation control circuit 178 which is formed on a substrate 178a. With this arrangement, as a pulley (not shown) which is driven by the motor 172 rotates, the resulting air stream cools down the fin 177 and thus dissipates heat from the transistor 179. In addition, this mounting of the transistor 179 of the motor 172 facilitates the assembly operation and minimizes the space requirement.

Figure 31:
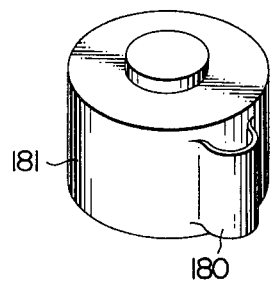
FIG. 31 is a perspective view of the motor shown in FIG. 30 when it is assembled.

FIG. 31 shows a heat radiating fin 180 which is integrally drawn from a body 181 of a shield case. It is also possible to provide the heat radiating fin on the housing 182 (see FIG. 30) of the motor 172 rather than the shield case.

Figure 32:
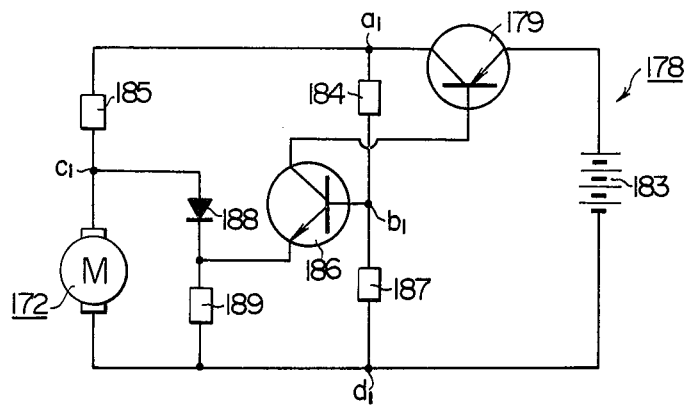
FIG. 32 is a circuit diagram of a control circuit for the motor.

FIG. 32 shows a circuit diagram of a specific example of a rotation control circuit 178. The positive pole of a power source 183 is connected with the emitter of a control transistor 179, which has its collector connected with impedance elements 184, 185 as shown at a1. The base of the transistor 179 is connected with the collector of a comparison transistor 186, the base of which is connected with the junction between the impedance element 184 and another impedance element 187. The impedance element 185 has its other terminal connected at c1 with the positive terminal of the motor 172 and the anode of a diode 188, the cathode of which is connected with the emitter of the transistor 186 and also with an impedance element 189. The other terminals of the impedance elements 187, 189 as well as the negative pole of the motor 172 are connected with the negative pole of the power source 183 as shown at d1.

The impedance elements 184, 185, 187 and 189 form together a voltage detection bridge, and an input to the bridge is applied across the points a1 and d1 while a level variation across the points b1 and c1 is detected by the bridge. When the voltage across the motor 172 or across the points c1 and d1 is reduced, the comparison transistor 186 conducts, diverting the current from the base of the control transistor 179 through the transistor 186 and the impedance element 189 to the point d1, thus increasing the voltage across the motor 172. In this manner, the voltage across the motor 172 is maintained constant so as to maintain a constant rotational speed. In the arrangement described, there occurs a large variation in the output from the control transistor 179, which thus is susceptible to an increased amount of power dissipation which must be accommodated for by some heat radiating means. According to the invention, heat dissipation from the transistor 179 is achieved by the heat radiating fin 177 which is substantially integral with the motor 172, thus preventing a temperature rise of the transistor 179.

Figure 33:
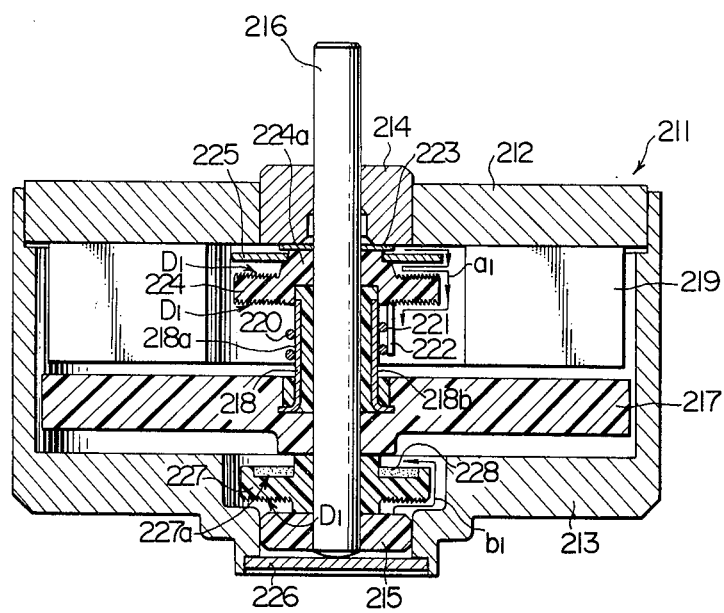
FIG. 33 is a cross section of a further embodiment of the invention.
Figure 34:
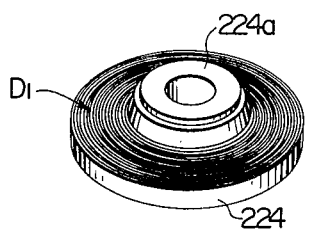
FIG. 34 is a perspective view of one example of a slinger.
Figure 35:
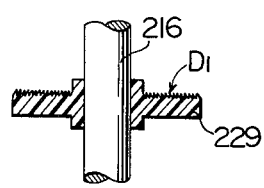
FIG. 35 is a cross section, showing another example of a slinger in association with the motor shaft.

FIGS. 33 to 35 show another arrangement for the flat miniature dynamoelectric machine of the invention in which a slinger of a special configuration is used to prevent ingress or flow of lubricant from the bearing or from the exterior. Referring to FIG. 33, the motor 211 according to the invention comprises a pair of mating upper and lower housing portions 212, 213 which also serve as a yoke. A pair of bearings 214, 215 are centrally mounted in the respective housing portions for rotatably carrying a shaft 216. Within the housing, a flat rotor 217 and a commutator 218 integral therewith are both fixedly mounted on the shaft 216, and a permanent magnet 219 is fixedly mounted on the upper housing portion 212 so as to be opposite to the upper end face of the rotor 217. Conductive brushes 220, 221 are disposed for sliding contact with exposed portions 218a, 218b of the commutator 218. As shown with respect to the brush 221, these brushes are carried by a support 222 which is mounted on the upper housing portion 212. The shaft 216 extends through the upper bearing 214 to the exterior of the housing for connection with a driven apparatus.

Intermediate the upper bearing 214 and the commutator 218, the shaft 216 carries a collar 223 and a slinger 224 which is disposed below the collar 223. The slinger 224 includes a boss 224a on which is fitted a slinger collar 225 of a known form. The lower end of the shaft 216 abuts against a bearing plate 226 which is fixedly mounted centrally on the exterior surface of the lower housing portion 213. Intermediate the bearing 215 and the rotor 217, the shaft 216 is fitted with another slinger 227. The slinger 227 is formed with a recess 227a in its upper surface in which is mounted a liquid absorbing sheet 228 such as felt or absorptive paper.

The bearing 214 is formed of a sintered metal which is impregnated with a large quantity of lubricant while the bearing 215 is molded from an oil impregnated resin. In either instance, the lubricant comes out of the bearings as the shaft 216 rotates to circulate along paths indicated by arrows $a_1$, $b_1$, tending to flow toward the commutator 218 and the rotor 217.

The opposite surfaces of the slinger 224 as well as the lower surface of the slinger 227 are formed with a plurality of grooves $D_1$ which are saw-toothed in cross section and which may be in the form of concentric circles or spirals, either continuous or interrupted (see FIG. 34). These grooves completely retain the circulating lubricant, blocking its flow along the paths $a_1$, $b_1$. If the circulation of the lubricant continues over the lower slinger 227, it is absorbed by the liquid absorbing sheet 228. These slingers 224, 227 may be formed by machining or molding from a synthetic resin into any desired configuration such as a disc or a square plate. The saw teeth which define the groove $D_1$ may be directed toward the axis or toward the outer periphery, depending on the direction of circulation of the lubricant. FIG. 35 shows a slinger 229 which is formed with grooves $D_1$ only in its upper surface, illustrating the flexibility for the provision of the grooves. The provision of the liquid absorbing sheet 228 is not essential.

What is claimed is:

1. A flat miniature dynamoelectric machine comprising a flat rotor having a coreless coil, a commutator integrally carrying the rotor and having an exposed portion for sliding contact, a shaft fixedly carrying the rotor and the commutator thereon, a housing including bearing means which rotatably carries the shaft, one end of the shaft projecting externally of the housing, a magnet disposed within the housing so as to establish a magnetic field for cooperation with the rotor, conductive brushes disposed within the housing for sliding contact with the exposed portion of the commutator, and a thrust bearing plate mounted on the housing for resilient abutment against the other end of the shaft, said conductive brushes comprising a Z-shaped support member of a resilient metallic material having one end fixedly mounted on the machine and having the other end defining a fork-like shape having a pair of prongs, and conducting members fixedly mounted on the respective prongs for sliding contact with the commutator.

2. A flat miniature dynamoelectric machine according to claim 1 in which the thrust bearing plate comprises a single resilient plate secured to the housing.

3. A flat miniature dynamoelectric machine according to claim 1 in which the thrust bearing plate is fixedly mounted on a resilient abutment plate mounted on the housing.

4. A flat miniature dynamoelectric machine according to claim 1 in which the housing includes a bottom which is provided with a plurality of steps of different sizes for permitting a thrust bearing plate of a corresponding size to be selectively engaged therewith, thereby enabling an adjustment in the mounting position of the thrust bearing plate in the thrustwise direction.

5. A flat miniature dynamoelectric machine according to claim 1 in which the shaft is formed with grooves to ensure a firm bonding with the commutator.

6. A flat miniature dynamoelectric machine according to claim 1 in which the commutator includes a tubular conductive body having first notches at one end defining tabs for connection with a coil, and having second notches of a greater size than said first notches in said tubular conductive body at the opposite end thereof, said tubular conductive body being integrally molded with an insulating support from a synthetic resin and having cuts therein to define commutator segments.

7. A flat miniature dynamoelectric machine according to claim 1 in which the conductive brushes each have one end fixedly mounted on a brush support formed by a frame which is a close fit inside the inner wall of the housing, the brush support being molded from a synthetic resin material so as to be integral with the conductive brushes.

8. A flat miniature dynamoelectric machine according to claim 1 in which the conductive brushes each have one end secured to a brush support formed by a frame which is a close fit inside the inner wall of the housing, the support including an upright wall which form a guide-way for lead wires connected with the conductive brushes, the housing being provided with an opening for passage of the lead wires therethrough.

9. A flat miniature dynamoelectric machine according to claim 1 in which the housing comprises an upper cylindrical housing portion and a lower disc-shaped housing portion, the upper housing portion being formed with a plurality of sets of notches of different depths in its juncture region with the lower housing portion, the lower housing portion being formed with a plurality of pawls adapted to engage a selected one of the sets of notches formed in the upper housing portion, thereby enabling the both housing portions to be engaged with each other at a selective one of a plurality of relative axial positions.

10. A flat miniature dynamoelectric machine according to claim 1 in which the housing is externally provided with a fin which serves as a retaining means for a transistor element.

11. A flat miniature dynamoelectric machine according to claim 1 in which the magnet comprises an endless ring.

12. A flat miniature dynamoelectric machine according to claim 1, further including a slinger mounted on the shaft at a position axially inward of the bearing means for preventing a circulation of lubricant, the slinger being formed with a plurality of grooves in its surface which are saw-toothed in cross section.

* * * * *